United States Patent [19]

Fisher

[11] Patent Number: 5,284,223
[45] Date of Patent: Feb. 8, 1994

[54] APPARATUS AND METHOD FOR VENTING AND FOR MONITORING OIL LEVELS IN MARINE OUTDRIVES

[75] Inventor: Chelsea G. Fisher, Seattle, Wash.
[73] Assignee: Unit Saver, Inc., Auburn, Wash.
[21] Appl. No.: 904,339
[22] Filed: Jun. 25, 1992

Related U.S. Application Data

[63] Continuation-in-part of Ser. No. 274,280, Nov. 21, 1988, abandoned.

[51] Int. Cl.$^5$ .................. F01M 1/18; F01M 11/10
[52] U.S. Cl. ........................ 184/6.4; 184/65; 184/108; 440/88; 440/112
[58] Field of Search ............... 440/75, 76, 77, 88, 440/112; 184/6.4, 6.12, 65, 108, 105.1

[56] References Cited

U.S. PATENT DOCUMENTS

| | | | |
|---|---|---|---|
| 3,183,880 | 5/1965 | Shimanckas | 440/88 |
| 3,335,817 | 8/1967 | Horning | 184/6.21 |
| 3,520,272 | 7/1970 | Ellzey | 440/88 |
| 4,872,531 | 10/1989 | Meisenburg et al. | 440/88 |
| 4,921,071 | 5/1990 | Lonnborg et al. | 184/103.1 |

FOREIGN PATENT DOCUMENTS 722419 11/1965 Canada .................. 440/88

Primary Examiner—Thomas E. Denion
Attorney, Agent, or Firm—R. Reams Goodloe, Jr.

[57] ABSTRACT

Oil venting and monitoring apparatus for marine outdrives. The apparatus includes an oil monitoring reservoir suitable for locating inside the boat. The reservoir is in fluid communication with the fully oil flooded head of the marine outdrive. The reservoir can be observed for an indication of oil level and oil condition. A clear plastic oil reservoir may be used to enhance visual observation. Unlike conventional outdrives, the oil reservoir is convenient for the addition of oil as necessary during and after operation. The apparatus is preferably designed with at least a one inch (1") diameter oil fill hole and typically is of one (1) quart or more oil capacity, so that an entire quart of oil can be quickly added to the system at one time. Also, audible and visual warning systems are included to warn the operator of a low oil condition, or of excess metal in the oil. The reservoir includes an atmospheric vent at the upper reaches thereof, which allows vapors to migrate inward and outward as the oil and engine parts expand and contract, to avoid creation of a vacuum or pressure within the outdrive head, which event causes seals to allow migration of contaminated water in outdrives not equipped with this system.

4 Claims, 5 Drawing Sheets

APPARATUS AND METHOD FOR VENTING AND FOR MONITORING OIL LEVELS IN MARINE OUTDRIVES

This application is a continuation-in-part of U.S. patent application Ser. No. 07/274,280 filed Nov. 21, 1988 now abandoned.

TECHNICAL FIELD OF THE INVENTION

This invention relates to a novel, improved apparatus and to a method for providing a pressure equalizing vent and for monitoring the oil level in marine outdrive units. Devices of that character are particularly useful for improving the service life of marine outdrive units. Such devices will be variously referred to herein as oil reservoir and monitoring systems, and as vent systems.

BACKGROUND OF THE INVENTION

A continuing demand exists for a simple, inexpensive method and apparatus which can be used to vent marine outdrive units, and which can also be used to monitor and insure adequate oil supply to marine outdrive units. In particular, a need exists for a simple, inexpensive system to enable a marine outdrive to utilize a pressure equalization vent to eliminate the slight positive pressure which occurs by the heating of a marine outdrive unit during operation, and to eliminate the slight negative pressure which occurs in a marine outdrive unit upon cooling after operation. Also, it would be desirable for a boat operator to be able to visually check the outdrive oil system to be sure that (a) sufficient oil is in the system, and (b) that the oil is of the desired quality, and has not become contaminated or emulsified by water or other foreign substance.

The need for such devices is commonly seen in conjunction with the use of marine outdrive units, where it is desirable to (a) prevent corrosive saline water from being sucked into a cooling outdrive unit after the use of same, and (b) to conveniently monitor the oil level while the unit is operating. Currently, it is difficult or impossible to monitor the oil level in marine outdrives while operating the unit. As a result, there are concomitant adverse effects on outdrive service life and on outdrive unit maintenance costs.

For example, I have inadvertently damaged several outdrive units on a commercial fishing boat that I own by catching trolling wire in the prop and ruining the seal around the output shaft. In systems such as those manufactured by Volvo and some other manufacturers, there is no way to check the oil level for so long as the outdrive unit is in the water. Thus, I had no warning that the oil level was running low, and did not discover the loss of oil from the outdrive gear system until after operation had occurred without benefit of lubrication. Consequently, expensive repairs were necessary.

It should also be noted that a failure of critical outdrive unit seals can also be the result of normal wear and tear, or by operating for extended periods of time with dirty oil (for example, contaminated with metal flakes), or by striking submerged objects with the prop. In a few cases, oil may be lost immediately and the danger created of unit operation without lubrication.

Most outdrive units have oil levels which do not completely fill the upper shell of the outdrive, so as to allow for expansion of the oil during operation. In some models, a gimble bearing which supports the upper gear set is located above the normal oil level, and is lubricated by splash from gears during operation. Even if no immediate problem occurs due to the aforementioned damage to seals, when the outdrive cools after normal operation, the vapor space in the top of most outdrive units tends to create a vacuum, which draws saline waters into the outdrive unit through any damaged or leaky seals. Thereafter, once the unit cools, loss of oil may occur through leaky seals. Thus, many outdrive units are damaged while sitting in the marina between periods of service.

Another condition adverse to extended outdrive unit service life is that cooling of moist air within the outdrive vapor space causes condensation to form within the cap and on the upper gear set bearing. The ensuing rust may cause premature failure of the bearing, and contributes to wear rates and reduced service life of the gears and the seals.

In addition, since most factory built outdrive systems lack a vent system, outdrive units have a moderate amount of internal pressure build-up due to oil expansion caused by higher oil temperatures which are experienced during high speed operations. This tends to force oil outward through the oil seals which seal oil in and water out, and such leakage may occur through damaged or weak seals.

Another common deficiency of the heretofore available oil systems for outdrive units is the absence of a readily apparent visual indication to the operator that an adequate supply of suitable oil is available to the outdrive unit. The advantage which would be provided by such an indication is important and self-evident.

SUMMARY OF THE INVENTION

I have now invented, and disclose herein, a novel, improved method and apparatus for venting and for the supply and monitoring of oil in marine outdrive systems. My apparatus and method does not have the above-discussed drawbacks common to those heretofore used outdrive oil supply systems of which I am aware. Unlike oil supply systems heretofore available, my system is simple, compact, relatively inexpensive, light, and easy to install, yet provides a needed vent function and visual monitoring method for oil supply. The apparatus makes it easy to monitor and to add oil and is otherwise superior to the heretofore available systems of which I am aware.

My novel method and apparatus for venting, monitoring, and supplying oil to outdrive units differs from those systems commonly available in one respect in that my system has a simple oil monitoring reservoir suitable for locating inside the boat, which can be observed for an indication of oil level, in addition to audible and visual warning systems, and to which oil can be added during operation, as necessary.

I have now developed a venting, oil level monitoring and oil addition apparatus for use in combination with a marine outdrive for facilitating the constant supply of lubricating oil to the outdrive unit, so as to inhibit the deterioration of the outdrive system. The venting, oil addition, and monitoring apparatus may be used with the type of marine propulsion system having an engine integrally connected to an outdrive. The apparatus includes an oil reservoir having an upper vent connection, and a conduit suitable for allowing the passage of oil between the outdrive unit and the oil reservoir. Additional features include the indication of a normal and low operating oil level indicators at the oil reservoir. Also, automatic electronic oil level monitoring and excess metal detection devices may be advantageously connected at the oil reservoir. In addition, suitable hardware, such as flexible braided stainless steel covered hose and suitable quick connect fittings, provide the necessary conduit connection means between the oil reservoir inside a boat and a variably positioned outdrive at the stern of the boat.

My apparatus, which I have called a "Unit Saver" because of its ability to save and extend the life of an outdrive unit, alleviates the slow, tedious job of filling an outdrive unit such as the Volvo brand design. In Volvo's design, approximately three and one-half (3 ½) quarts of oil must be fed slowly into the unit through a dipstick hole, which may be only one quarter (¼) inch or three eighths (⅜) inch in diameter. The need for a convenient method of pouring oil into an outdrive unit is shared by all outdrive unit owners during both oil changes and when adding makeup oil. In contrast, the clear plastic oil reservoir of my apparatus is designed with at least a one inch (1") diameter fill hole and typically one (1) quart or more capacity, so that an entire quart of oil can be quickly added to the system at one time.

Other embodiments of my apparatus and method provide further variations in routing of the vent and oil line to the outdrive unit.

Aside from the foregoing, my novel apparatus is simple, durable, and relatively inexpensive to manufacture. My apparatus and method for venting, monitoring oil levels, and for adding oil in outdrives is a substantial improvement over the previous apparatus and methods methods known to me.

OBJECTS, ADVANTAGES, AND FEATURES OF THE INVENTION

From the foregoing, it will be apparent to the reader that one important and primary object of the present invention resides in the provision of a novel, improved method and apparatus to provide a means for both venting and for maintaining an adequate operating oil level in marine outdrive units, thereby preventing or reducing corrosion damage and lubrication failures to such outdrive units.

Other important but more specific objects of the invention reside in the provision of venting and oil monitoring systems as described in the preceding paragraph which:

- enable an outdrive unit to operate at atmospheric pressure within the unit, by providing a suitable pressure equalizing vent to the atmosphere to accommodate the expansion and contraction which occurs due to heating and cooling of the outdrive unit;
- allow the addition of oil to an outdrive unit to be done in a simple, one step manner;
- allow the monitoring of oil levels in an outdrive unit from inside the boat;
- allow the monitoring of oil levels in an outdrive unit even during unit operation;
- in conjunction with the preceding object, have the advantage that they can be installed in a convenient location for easy access during boat operations;
- provide by simple observation an indication to the operator of the oil level and oil condition, while the boat is operated;
- are relatively inexpensive;
- are relatively simple to install;
- are relatively compact and thereby require little space;
- allow operation of outdrive units with fully oil flooded, zero headspace covers;
- prevent the intake of saline waters to outdrive units to thereby prevent corrosion damage to critical components.

Other important objects, features, and additional advantages of my invention will become apparent to the reader from the foregoing and the appended claims and as the ensuing detailed description and discussion proceeds in conjunction with the accompanying drawing.

BRIEF DESCRIPTION OF THE DRAWING

In the drawing.

In so far as possible, like reference numbers are used to indicate like parts throughout the several figures; similar parts may be indicated without additional description by use of a "prime" suffix where similar parts are used in slightly different configurations or locations.

DETAILED DESCRIPTION OF THE INVENTION

Figure 1:
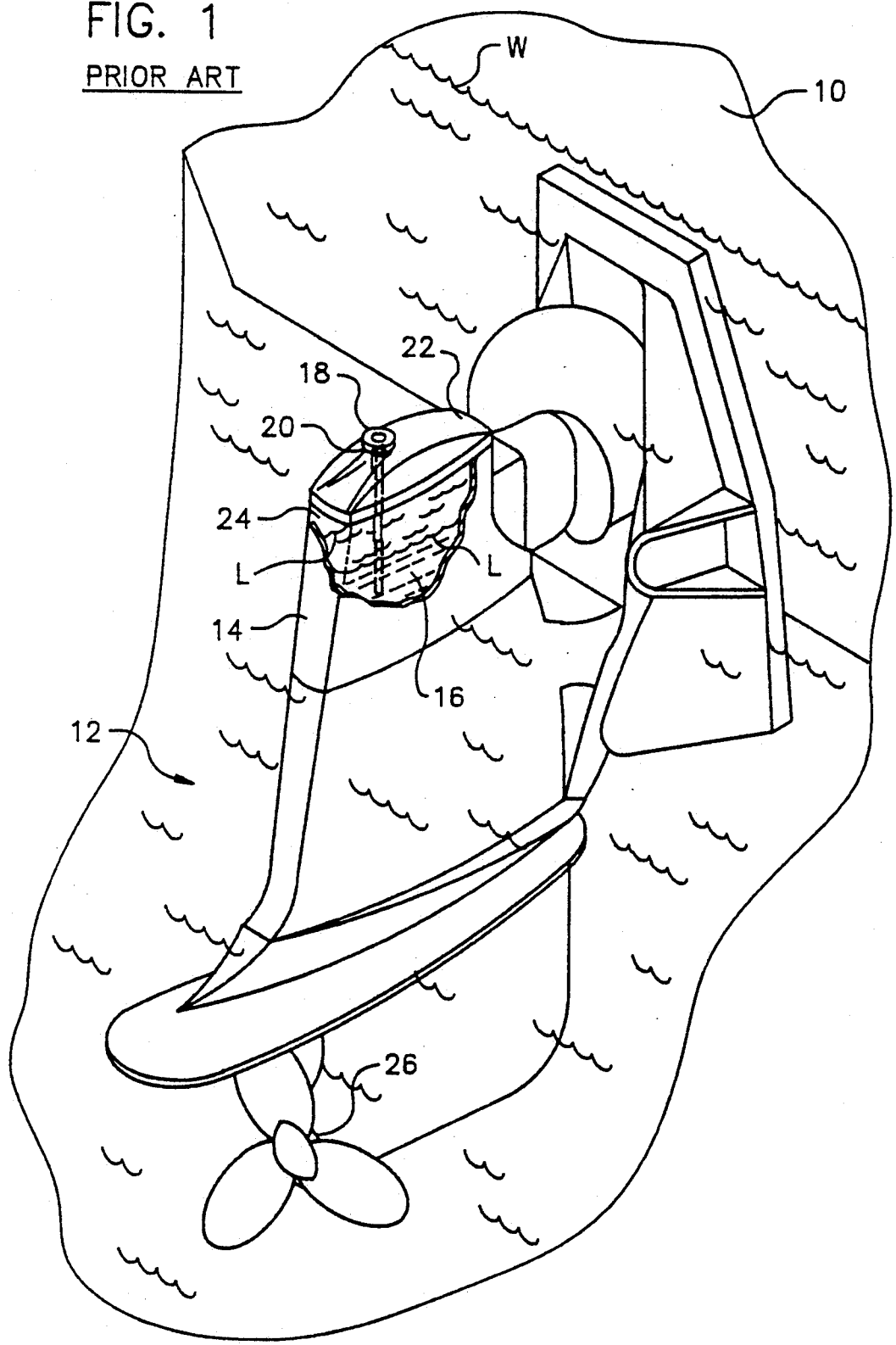
FIG. 1 is a perspective view of a prior art marine outdrive unit, illustrating the typical operating configuration.

Attention is now directed to FIG. 1, where the transom 10 of a boat (not shown) has attached thereto an outdrive unit 12 with a typical factory provided prior art oil system. In the unit 12, the head 14 is filled with oil 16 to a level L which may fluctuate upward or downward within head 14 of outdrive unit 12, depending upon the amount of oil 16 placed in the unit 12 oil system, and upon the operating temperature of the oil 16. It should be noted that unit 12 is normally below water line W while the boat is in the water, making it difficult or impossible to access dipstick 18 to determine the actual operating oil 14 level L.

To avoid passage of water into the head 14 of outdrive unit 12, the a seal 20 is provided on the underside of dipstick 18, to seal it against the cap 22 of head 14. However, air and water vapor in space 24 above the oil level L in head 14 may expand as unit 12 heats during operation. Without venting, pressure inevitably builds up against seal 20, as well as lower shaft seal 26, thus causing oil 16 to tend to escape outward into the water.

More damaging, as the unit 12 cools after use, water may be draw into the unit 12 through seals 20 and 26.

Figure 2:
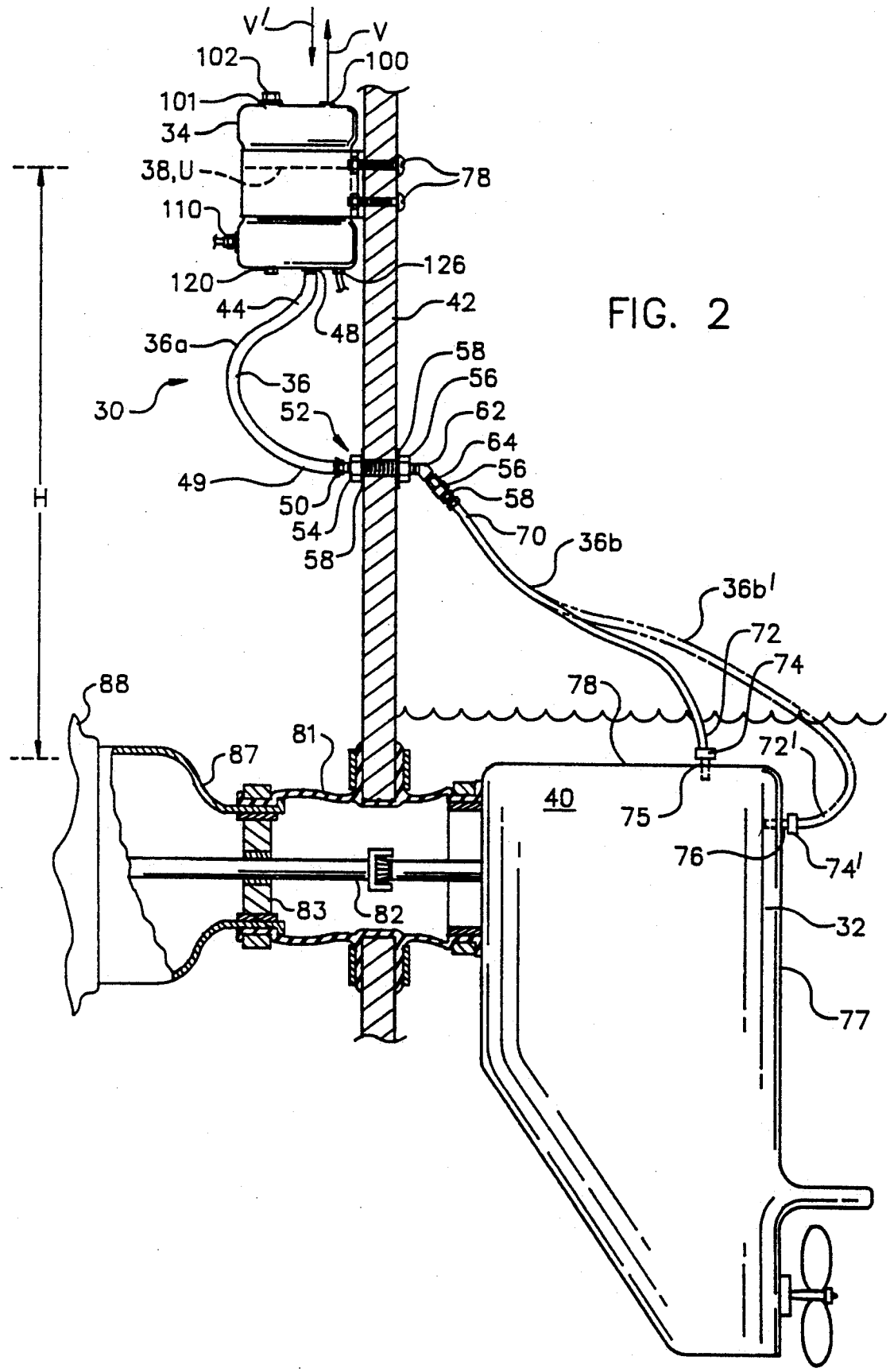
FIG. 2 is a vertical cross sectional view of a transom a boat showing installed a first embodiment of a venting and oil level monitoring and addition system constructed in accordance with the teachings of the present invention.

Turning now to FIG. 2, one embodiment of the oil supply and monitoring apparatus 30 is shown connected to an outdrive unit 32. The basic parts of the oil supply and monitoring apparatus 30 are a reservoir 34 and an oil line 36. The oil line 36 allows communication of oil 38 (see FIG. 4; shown at level U there and in the oil reservoir 34 of this FIG. 2) between the upper reaches 40 of outdrive unit 32 and the reservoir 34.

Oil line 36 includes various features which enable passage of oil through the transom 42 and on to the variably positioned outdrive 32. A first end 44 of a first oil line segment 36a is connected to oil reservoir 34 at outlet fitting 48. The second end 49 of first oil line segment 36a is connected to an interior portion 50 of bulkhead fitting 52. Bulkhead fitting 52 provides an annular passageway, thus allowing oil 38 to pass therethrough. The bulkhead fitting is normally affixed to transom 42 via way of interior 54 and exterior 56 compression nuts, each of which has a gasket 58 between the nut and transom 42.

Figure 5:
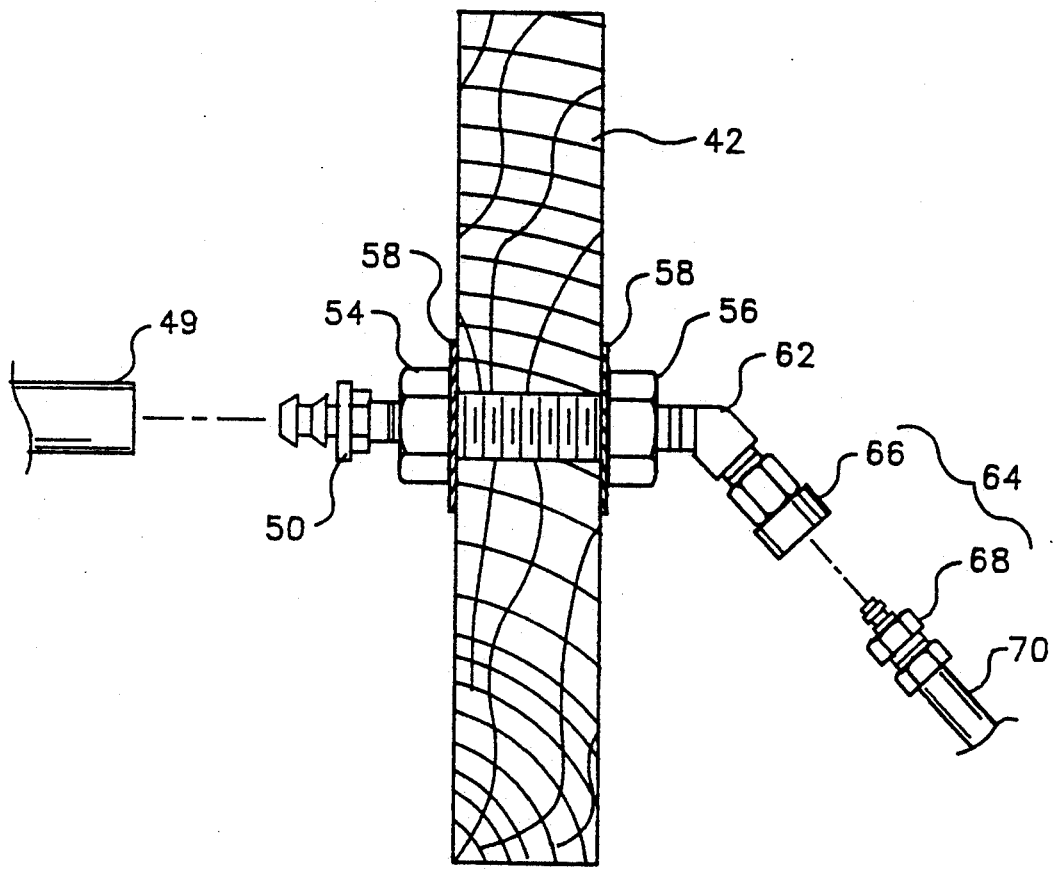
FIG. 5 is a vertical cross sectional view of the transom of a boat showing one method of passing the oil line of the present invention through the transom.

To facilitate directing the second oil line segment 36b toward the outdrive unit 32, I have found it convenient to provide a 45° elbow 62 to direct downward the flow of oil 38 toward outdrive 32 as it exits bulkhead fitting 52. For convenience, a swiveling quick coupling connection assembly 64 having a female end 56 and male end 58 may be utilized to enable easy hookup and removal of first end 70 of second oil line segment 36b from outdrive 32. Further details of this feature are illustrated in FIG. 5 below.

The second end 72 of second oil line segment 36b enters the outdrive unit 32 through an oil passage adaptor 74. The adaptor 74 may be advantageously sized to fit an existing dipstick 18 passageway 75 in those outdrive units which have such as feature (see FIG. 1, for example). Alternately a convenient and suitably sized opening 76 in the upper housing 78 of the outdrive 22 may be provided by any convenient method, such as here shown to connect the alternate oil line 36b' to alternate oil passage adaptor 74', here shown at the back 77 of outdrive 32.

Oil reservoir 34 may be attached to transom 42 by any convenient method, such as by way of fasteners 78 that penetrate the transom 42. Preferably, oil reservoir 34 is located at a suitable height H above the upper housing 78 of outdrive unit 32 so as to enable convenient gravity flow of oil from the reservoir 34 to outdrive 32. I have found that a height H of twelve (12) inches to twenty four (24) inches is normally adequate to provide the desired effect. Such positioning eliminates the need for mechanical oil recirculation systems, thus avoiding an additional risk of oil system failure.

Figure 2A:
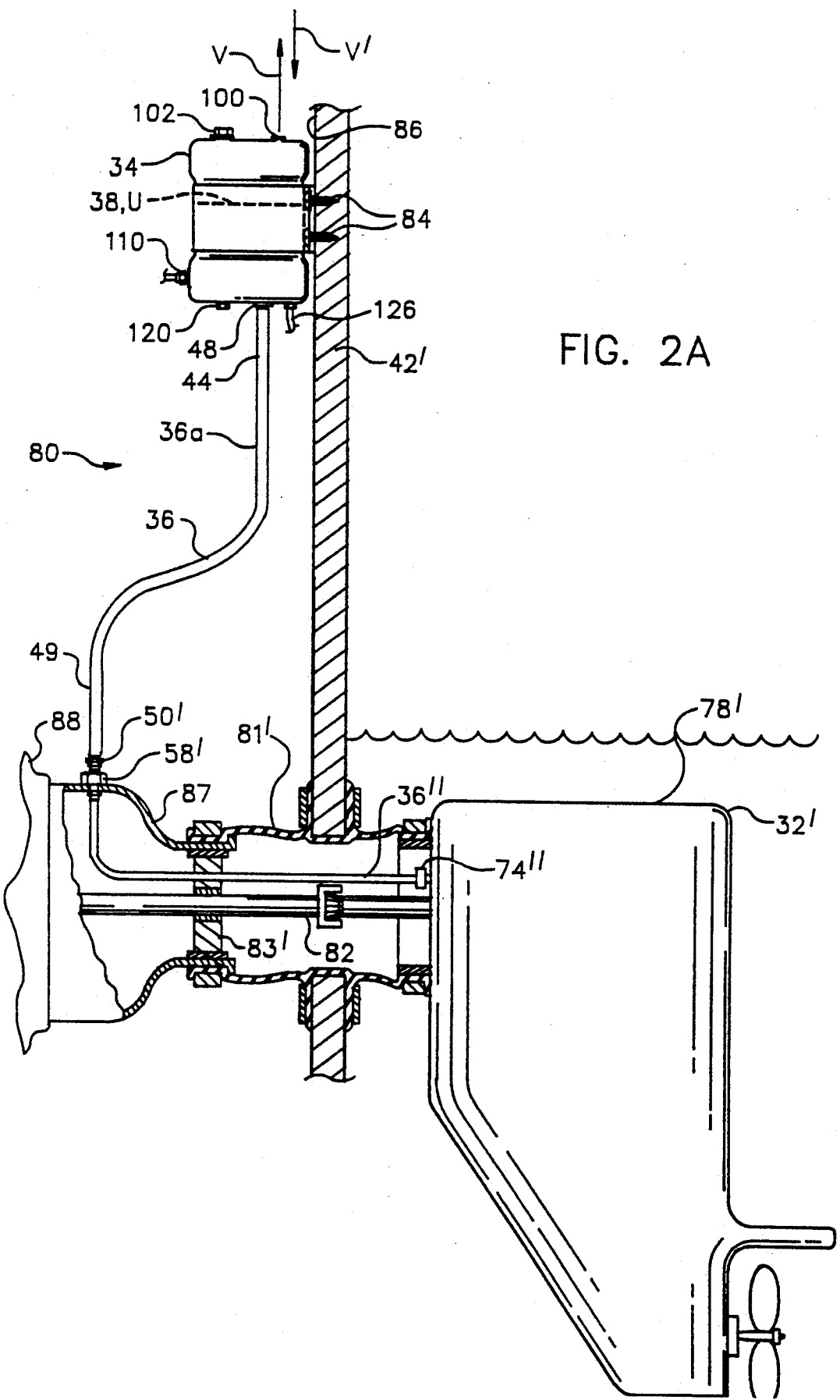
FIG. 2A is a vertical cross sectional view of a transom a boat showing installed a second embodiment of the venting and oil level monitoring and addition system constructed in accordance with the teachings of the present invention.

Turning now to FIG. 2A, an alternate embodiment of my apparatus 80 to provide venting and enhanced lubrication protection to marine outdrives is illustrated. Here, the need for additional thru-hull fittings is avoided by (i) running the oil line 36b'' through the transom 42 within the rubber boot 81 provided for the drive shaft 82, as well as through a portion of shaft seal 83' and into outdrive unit 32' at oil adaptor fitting 74''', and (ii) using suitable screws or other fasteners 84 to attach oil reservoir 34 to the interior 86 of transom 32. Note that oil line 36a ends at a bell housing 87 at the rear of engine 88, but otherwise the arrangement is similar to that first shown in FIG. 2 above.

Figure 3:
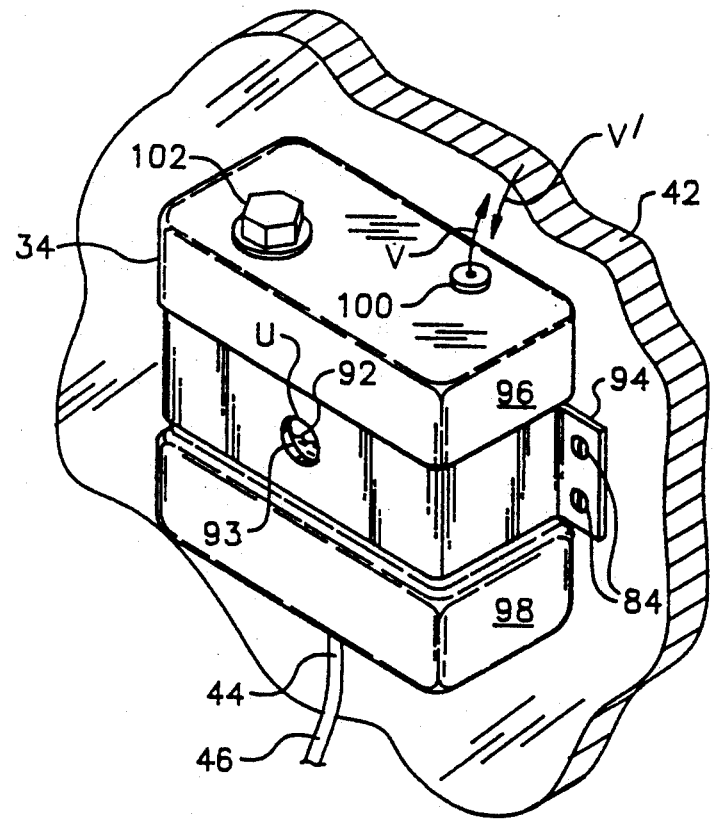
FIG. 3 is a perspective of the oil reservoir portion of the present invention.
Figure 4:
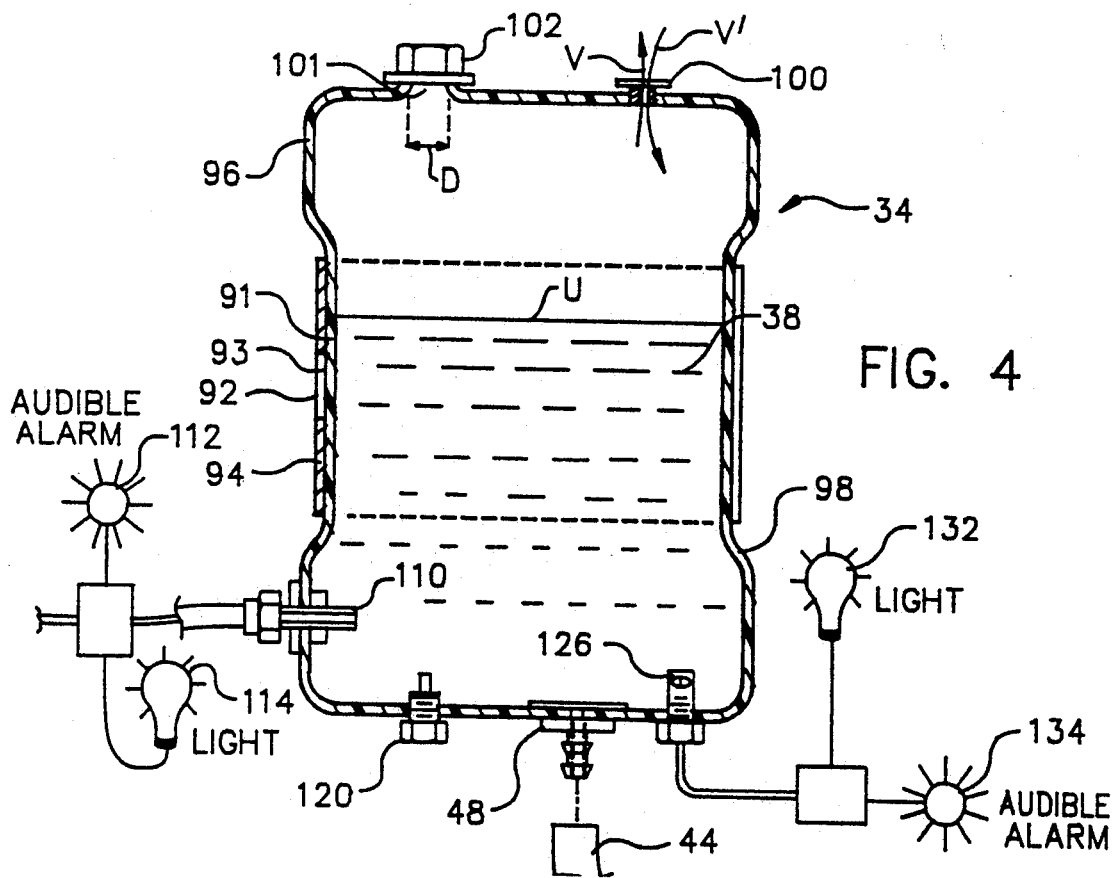
FIG. 4 is a vertical cross sectional view of an oil reservoir constructed in accord with the teachings of the present invention.

Attention is now directed to FIGS. 3 and 4, where details of the oil reservoir 34 ar shown. The reservoir 34 is preferably provided in a clear plastic material, which enables the user to see through the wall 91 of plastic reservoir 34 to observe the oil level U through observation port 92 which is defined by edges 93 which provide an opening in attachment strap 94. Also, oil 38 can be seen in the clear upper portion 96 and lower portion 98 of the reservoir 34.

An important advantage of the clear plastic oil reservoir 34 is the access for viewing both the oil level U and the quality of the oil. If the oil 38 and salt water mix, the oil turns a milky white color. If gear wear is excessive the oil will turn silver from metal flakes. Also, the oil color will turn quite dark after a period of normal wear, signaling that an oil change is due.

An atmospheric breather vent 100 is provided to allow heated vapors V to escape outward as heated oil 38 expands, and to allow air V' to enter when the oil system cools after operation. A fill port 101 is provided, which is normally closed via oil plug 102. This is important because in the usual outdrive unit, only a small oil fill port is provided, which takes great care and an inordinate amount of time to add oil, whereas this oil fill port 101 is of sufficient diameter D to allow quick addition of oil, for example in convenient quart containers.

Turning now to FIG. 4, the visual and audible oil level alarm and monitoring devices are shown. The need for a visual and audible oil level monitoring system is especially important when operating boats from an interior cabin or a flying bridge. My system incorporates two types of alarm systems, and normally locates the sensing devices in the clear plastic oil reservoir 34. A detector 110 is provided for an oil low level alarm system indicator which may be located where convenient. When oil level U drops to a position at the level indicator detector 110, a signal is sent to the audible 112 and visible 114 alarm signal devices. One simple way to accomplish this is by use of a commercially available Kysor brand five (5) post warning module and wiring harness.

The need for metal detection is accomplished in one of two ways, either by visual checking of the magnetic drain plug 120 or with a special aircraft metal detector sending unit 126, which activates a visual 132 and audible 134 alarm system. For simplicity and low cost, the oil reservoir 34 is designed to use standard pipe plugs in place of either the magnetic drain plug 120 or the aircraft metal detector sending unit 126. The metal detector sending unit 126 is activated by bridging of two magnetic contracts in the sending unit by metal particles in the oil. When this occurs, audible 134 and visual 132 alarms are set off, thus alerting the operator to an abnormal wear condition.

In FIG. 5, the thru transom fitting 52 is shown in detail, along with a combination quick coupler disconnect. The thru transom fitting 52 is commonly fabricated out of a five eights (⅝) inch by two (2) inch length of stainless steel or brass round stock, drilled full length with at least a one eighth (⅛) inch bore, and tapped with one eighth (⅛) inch pipe threads inside. The outside is normally provided with five eighths (⅝) inch national coarse thread grade to receive the aforementioned compression nuts 54 and 56.

To allow for easy oil line 36b removal, and for allowing swivel in the oil line 36b for up and down as well as sideways steering and trim of the outdrive unit 32, a stainless steel swivel quick coupler assembly 64 is provided. As briefly described above, this assembly is mounted around an annular bulkhead fitting 52 which allows oil 38 to pass therethrough.

The bulkhead fitting is normally attached to transom 42 via way of interior 54 and exterior 56 compression nuts, each of which has a gasket 58 between the nut and transom 42.

To facilitate directing the second oil line segment 36b toward the outdrive unit 32, it is convenient to provide a 45° elbow 62 to direct the flow of oil 38 toward outdrive 32 as it exits bulkhead fitting 52. The swiveling quick coupling connection assembly 64 having a female end 66 and male end 68 may be utilized to enable easy hookup and removal of first end 70 of second oil line segment 36b to outdrive 32.

Figure 6:
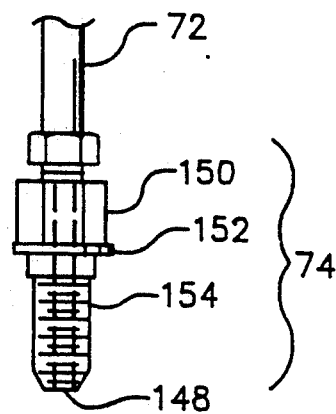
FIG. 6 is a side view of the oil passage nozzle installed in the outdrive unit housing to allow oil to communicate with the external oil reservoir.

FIG. 6 shows the oil inlet fitting 74 which is provided at the outdrive unit 32 to allow entry of oil to the outdrive unit 32 through annular opening 148. The fitting normally includes a hexhead 150 and an o-ring 152 to securely affix the fitting to outdrive unit 32 via screwing threads 154 into complimentary threads in opening 76 in outdrive 32.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalences of the claims are therefore intended to be embraced therein.

What is claimed is:

1. A venting and oil reservoir apparatus for marine outdrives having an upper head with oil contained therein, said marine outdrive adapted for connection to an inboard mounted engine in a boat having a transom, said apparatus comprising:
    (a) a fluid passage means, said fluid passage means comprising:
        (1) a first oil line segment, said segment having a first end and a second end, said first end communicating with and attached to said upper head of said marine outdrive;
        (2) a thru transom fitting, said fitting having an interior portion and an exterior portion, said exterior portion affixed to and communicating with said second end of said first oil line segment;
        (3) a second oil line segment, said segment having a first end and a second end, said first end affixed to and communicating with said thru transom fitting;
        (4) a swivel type quick coupling connection, said connection located adjacent said through transom fitting and joining said fitting with said second oil line segment;
    (b) a liquid reservoir, said reservoir suitable for receiving oil therein, said reservoir affixed to and communicating with said second end of said second oil line segment;
    (c) wherein said reservoir and said upper head are interconnected by said fluid passage means.

2. The apparatus of claim 1, wherein said reservoir further includes a vent.

3. The apparatus of claim 2, wherein said reservoir further includes a low oil level alarm sending unit.

4. The apparatus of claim 3, wherein said reservoir further includes a metal chip detection alarm sending unit.

* * * * *